United States Patent [19]

Tsuboyama et al.

[11] Patent Number: 5,606,343
[45] Date of Patent: Feb. 25, 1997

[54] DISPLAY DEVICE

[75] Inventors: Akira Tsuboyama, Atsugi; Atsushi Mizutome, Fujisawa; Mitsuo Iwayama, Odawara, all of Japan

[73] Assignee: Canon Kabushiki Kaisha, Tokyo, Japan

[21] Appl. No.: 302,989

[22] Filed: Sep. 14, 1994

Related U.S. Application Data

[63] Continuation of Ser. No. 913,917, Jul. 17, 1992, abandoned.

[30] Foreign Application Priority Data

Jul. 24, 1991 [JP] Japan .................................. 3-206184

[51] Int. Cl.⁶ .................................................. G09G 3/36
[52] U.S. Cl. .................................................. 345/97; 345/99
[58] Field of Search .......................... 371/66; 364/707; 345/1, 3, 11, 87, 97, 94, 98, 200, 99, 10

[56] References Cited

U.S. PATENT DOCUMENTS

| | | | |
|---|---|---|---|
| 4,285,043 | 8/1981 | Hashimoto et al. | 364/707 |
| 4,655,561 | 4/1987 | Kanbe et al. | |
| 4,804,951 | 2/1989 | Yamashita et al. | |
| 4,926,166 | 5/1990 | Fujisawa et al. | 340/717 |
| 5,010,327 | 4/1991 | Wakita et al. | 340/784 |
| 5,021,983 | 6/1991 | Nguyen et al. | 371/66 |
| 5,041,821 | 8/1991 | Onisuka et al. | |
| 5,058,994 | 10/1991 | Mihara et al. | |
| 5,059,961 | 10/1991 | Cheng | 345/10 |
| 5,066,945 | 11/1991 | Kanno et al. | |
| 5,091,723 | 2/1992 | Kanno et al. | |
| 5,107,354 | 4/1992 | Yamazaki et al. | 359/56 |
| 5,113,181 | 5/1992 | Inoue et al. | |
| 5,140,310 | 8/1992 | DeLuca et al. | 340/636 |
| 5,357,267 | 10/1994 | Inoue | 345/98 |

FOREIGN PATENT DOCUMENTS

| | | |
|---|---|---|
| 0347530 | 12/1989 | European Pat. Off. |
| 0424958 | 5/1991 | European Pat. Off. |
| 0456012 | 11/1991 | European Pat. Off. |
| 2075738 | 11/1981 | United Kingdom. |

*Primary Examiner*—Steven Saras
*Attorney, Agent, or Firm*—Fitzpatrick, Cella, Harper & Scinto

[57] ABSTRACT

A display device for displaying an image in accordance with image signal by applying a drive signal to a ferroelectric liquid crystal which holds an optical state even in a zero electric field state from drive means through scan electrodes and information electrodes in accordance with image information stored in image information memory means, comprises change detection means for detecting change in the image information stored in the image information memory means, and drive control means for controlling drive means in accordance with detection result by the change detection means to apply a signal to erase the display, stop the application of the drive signal or resume the application of the drive signal.

9 Claims, 2 Drawing Sheets

DISPLAY DEVICE

This application is a continuation of application Ser. No. 07/913,917 filed Jul. 17, 1992 now abandoned.

BACKGROUND OF THE INVENTION

1. Field of the Invention

The present invention relates to a display device, and more particularly to a liquid crystal display device for displaying video information by arranging scan signal lines and information signal lines in a matrix and driving them by applying a scan signal and an information signal, respectively, with a memory property in the liquid crystal.

2. Related Background Art

A refresh scan type CRT has been primarily used as a computer terminal display device with a frame frequency of no lower than 60 Hz being used to prevent flicker and a non-interlace system has been adopted to improve visibility of a moving display of screen information (the movement of a mouse or an icon). (Note: In a television system, the interlace system has been adopted to display animation, and a field frequency is 60 Hz and a frame frequency is 30 Hz). Thus, the higher a display resolution is, the higher is the power required, and a drive control unit is larger in size and more expensive.

Recently, a flat panel display has been attracting the notice because of the inconvenience of the CRT due to its large volume and high power consumption.

Several flat panel display systems are known. For example, a high time-division system of twisted nematic liquid crystal (STN), a monochromatic version thereof (NTN) and a plasma display system adopt the same image data transfer system as that of a CRT and adopt the non-interlace system with a frame frequency of no lower than 60 Hz as an image refresh system. This is because these display panels have no memory property in principle and hence require a refresh cycle of no lower than 60 Hz in the frame frequency in order to prevent flicker. In a system in which switching transistors or non-linear devices are built in respective pixels of the twisted nematic liquid crystal (TFT, MIM, TFD etc.), image information can be maintained for one frame period at most. Thus, this system also requires a refresh cycle of no lower than 60 Hz.

On the other hand, a ferroelectric liquid crystal display device has a property of persistence of image information which has once been displayed (memory property) and hence it can display the image information on a much larger screen than those of the above-mentioned display devices with a higher resolution. However, because it uses a low frame frequency drive system, a partial rewriting scan system (in which only those scan lines whose image information has changed are scanned (driven)) which makes use of the memory property is necessary. The partial rewriting scan system is disclosed in U.S. Pat. No. 4,655,561 to Kambe et al and U.S. Pat. No. 5,091,723 to Konno et al, and a low frame frequency refresh drive system using multi-interlaced scan is disclosed in U.S. Pat. No. 5,058,994 to Mihara et al.

In the prior art control method for a ferroelectric liquid crystal display device, the partial rewriting scan is conducted when the image information has changed, and the total screen refreshing scan by the multi-interlaced scan is conducted when the image information does not change. Thus, even if there is no key entry or mouse scan because of the absence of an operator, the display panel continues the refreshing scan by the multi-interlaced scan. As a result, if the same image is continuously displayed on the screen for a long period because of no manipulation, the display screen is burnt and drive margin is lowered, which causes the degradation of image quality.

SUMMARY OF THE INVENTION

It is an object of the present invention to provide a display device which shortens the continued display period of the same image which causes the degradation of image quality, and to thereby prevent the degradation of image quality and improve reliability.

The present invention relates to a display device comprising:

A liquid crystal display panel having pixels arranged in rows and columns and defined by pairs of opposing electrodes and liquid crystal disposed between the pairs of electrodes, with the pixels on the rows being connected in common by scan lines and the pixels on the columns being connected in common by information lines;

image information memory means for storing image information to be displayed on said liquid crystal display;

change detection means for detecting change in the image information stored in said image information memory means;

drive means for applying a scan signal to said scan electrodes and an information signal to said information electrodes in accordance with the signal stored in said image information memory means; and drive control means for controlling said drive means, applying a signal to erase the display on said display panel, stopping the application of the scan signal and the information signal to said liquid crystal display panel and resuming the application of said signals in accordance with the detection result by said change detection means.

DETAILED DESCRIPTION OF THE PREFERRED EMBODIMENTS

Figure 1:
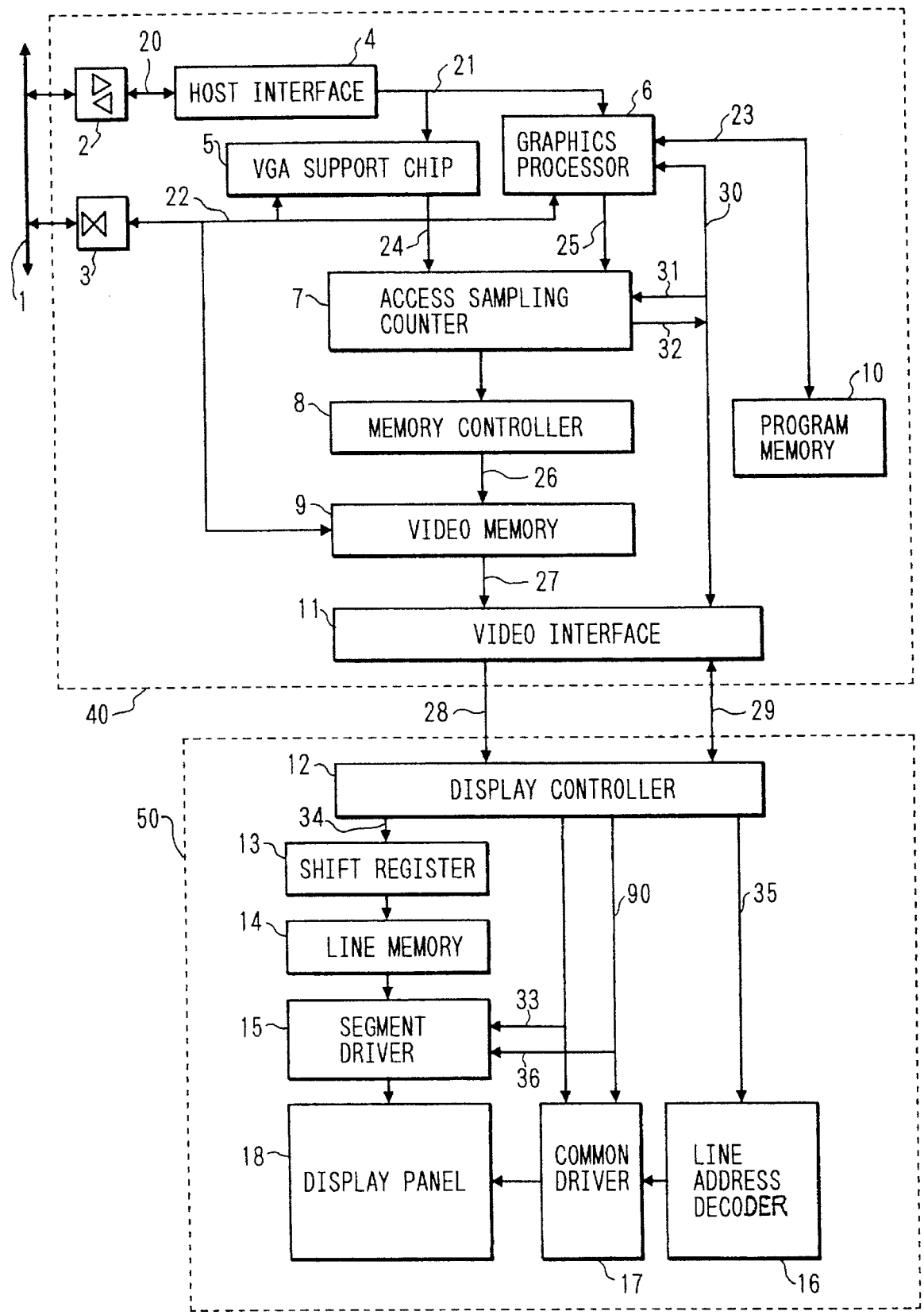
FIG. 1 is a block diagram of one embodiment of a display device of the present invention.

FIG. 1 is a block diagram of one embodiment of a display device of the present invention. In FIG. 1, numeral 1 denotes a system bus, numeral 2 denotes a driver for an address signal, an access request signal and an acknowledge signal, numeral 3 denotes a data buffer, numeral 4 denotes a host interface which is an interface circuit between a host CPU (not shown) connected to the bus 1 and a processor in a control circuit, numeral 5 denotes a large scale integrated (LSI) for supporting a video graphics adapter VGA register, numeral 6 denotes a graphics processor for drawing and data transfer, numeral 10 denotes a program memory comprising a dynamic RAM for storing a program for the graphics processor, numeral 7 denotes an access sampling counter which is reset by an access signal to a video memory, numeral 8 denotes a memory controller for generating a control signal to the video memory which stores display information, numeral 9 denotes a video memory, and numeral 11 denotes a video interface for exchanging video data and a sync. signal with a FLC display unit 50. These units form a control circuit 40 for the FLC display unit 50.

Numeral 20 denotes an address signal, an access request signal and an acknowledge signal, numeral 21 denotes an access signal to the VGA support chip 5 and the graphics processor 6, numeral 23 denotes data exchanged between the graphics processor 6 and the program memory 10, numeral 22 denotes data exchanged between the data buffer 3, and the VGA support chip 5, the graphics processor 6 and the video memory 9, numeral 24 denotes an access request for the video memory 9 from the VGA support chip 5 to the memory controller 8, numeral 25 denotes an access request for the video memory 9 from the graphics processor 6 to the memory controller 8, numeral 26 denotes a control signal to the video memory 9, numeral 27 denotes display data read from the video memory 9, numeral 28 denotes data to be sent to the FLC display unit 50, numeral 29 denotes a sync. signal and a control signal to and from the FLC display unit 50, numeral 30 denotes a sync. signal and a control signal, numeral 31 denotes a sync. signal applied to the access sampling counter 7, and numeral 32 denotes a signal noticing that there has been no access to the video memory 9 for a predetermined time period.

Numeral 12 denotes a display controller which interfaces the display control circuit 40 and the FLC display unit 50 controls a segment driver 15 and a common driver 17 and controls the overall display unit 50, numeral 13 denotes a shift register which transfer, one line of the video data 34 from the display controller 12, numeral 14 denotes a line memory for storing one line of the video data, numeral 15 denotes the segment driver for supplying a predetermined drive waveform to the information electrodes of a display panel 18 at a predetermined timing in accordance with the video data in the line memory 14, numeral 18 denotes the display panel which uses a ferroelectric liquid crystal, numeral 16 denotes a line address decoder for selecting a scan line address data 35 from the display controller 12, numeral 17 denotes the common driver for supplying a predetermined drive waveform to the selected scan line (scan electrode) at a predetermined timing, and numerals 33 and 36 denote control lines to the segment and common drivers, respectively. These units form the FLC display unit 50.

The basic operation of the image display in the device of FIG. 1 is now explained. The refreshing of the display screen by the host CPU (when the operator is conducting normal operation) is first explained.

In a conventional CRT control circuit, the host CPU can directly random access the video memory, but in the FLC display control circuit 40 of the present embodiment, the host CPU cannot directly access the video memory 9. Instead, the host CPU rewrites the display data through the graphics processor 6. For example, when a straight line is to be displayed, the host CPU issues a line draw command to the graphics processor 6 and sends necessary information such as a start point and an end point. The graphics processor determines an access address based on the given information to access the video memory 9. The display of other graphic patterns and characters and commands related to the VGA are executed by the graphics processor 6 or the VGA support chip 5 by accessing the video memory 9 in accordance with the command from the host CPU (or a BIOS command in case of VGA).

The access sampling counter 7 monitors the access to the video memory 9, and if there has been no access (writing) to the video memory 9 for a predetermined time period, it send a notice signal 32 to the FLC display unit 50. When the graphics processor 6 or the VGA support chip 5 accesses the video memory 9, the access sampling counter 7 is reset and it starts counting from the beginning. While the operator operates in a normal manner, the access to the video memory 9 is continuously repeated and the notice signal 32 is not produced from the access sampling counter 7.

The display data in the video memory 9 is read out line by line by a command from the graphics processor 6, and is supplied together with the scan address data (not shown in the control circuit of FIG. 1) to the FLC display unit 50 through the video interface 11. Whether the display data is draw data or not is determined by the graphics processor 6 by determining whether it is data requesting a response, that is, image information which requires partial rewriting, or by the host CPU by supplying to the graphics processor 6 identification information as to the data requiring the partial rewriting. The display data which requires the response to display to the FLC display is transferred at a high priority. The display controller 12 in the FLC display unit 50 receives the scan line address data and the display data (video data) from the FLC display control circuit 40, and transfers the scan line address data 35 to the line address decoder 16 of the scan electrode drivers (16, 17), and the video data 34 to the shift register 13 of the information electrode drivers (13–15).

The line address decoder 16 of the scan electrode drivers selects one scan line in accordance with the scan line address data 35. The common driver 17 supplies a predetermined drive waveform to the selected scan line (scan electrode) for a selection period (one horizontal scan period). On the other hand, at the end of the shift of one line of video data, the shift register 13 of the information electrode driver transfers the video data to the line memory 14 to hold it for one horizontal scan period. The segment driver 15 produces a drive waveform in accordance with the video data of the line memory 14, in synchronism with the selection period of the common driver 17. The writing to the display panel in the normal operation is accomplished by a commonly known line sequential scan, and the partial rewriting scan is made for the draw information which requires a response as a man-machine interface such as cursor movement, character entry and screen scroll, and a total screen refreshing by the multi-interlaced scan is made for other draw information.

When the host CPU does not update the display screen for a predetermined period, the access sampling counter 7 produces the notice signal 32 and the FLC display panel is driven to a totally black state to erase the display on the display panel, and the drive signal to panel 18 is terminated and the liquid crystal is driven into the memory status.

The access sampling counter 7 receives the access (write) signal to the video memory 9 as a reset (or present) signal, and the sync. signal 31 (for example, horizontal sync. signal) from the FLC display unit 50 as a clock, and an overflow (carry) signal of the counter is used as the notice signal 32 which indicates that there has been no access to the video memory 9 for the predetermined period. In practice, one frame time is counted based on the sync. signal 31 (horizontal sync. signal) (for example, where the number of scan lines is 1024, one frame time is the (horizontal sync. signal)×1024), one frame time is divided by 64 to generate the clock, which is supplied to an 8-bit counter (access sampling counter). Assuming that a standard horizontal scan period of the FLC display panel is 100 μs, the detection time may vary from approximately 6 seconds to approximately 27 minutes by appropriately presetting the counter. If there is no access to the video memory 9 for such a preset detection time, the access sampling counter 7 asserts (enables) the notice signal 32 to inform the display controller 12 that access to the video memory 9 has been stopped (no change in the screen display). The notice signal 32 is produced asynchronously with the drive of the display panel 18.

When the display controller 12 recognizes that the notice signal 32 has been asserted, it waits for the termination of the drive of the scan electrodes which are being scanned (because it receives the notice signal 32 asynchronously) and then sends a drive waveform output termination signal (contained in the signals 33 and 36) to the segment and common drivers. Then, the segment driver 15 simultaneously applies an erase signal to all bits. During the application time, the scan signal is kept at Vc shown in FIG. 2. After the scan, the image erase signal 90 is asserted and V4 shown in FIG. 2 is applied to all bits of the segment driver 15 for a predetermined period to simultaneously erase the entire screen display.

In the subsequent drive termination period, the segment driver 15 and the common driver 17 keep their output terminals to the FLC display panel 18 at the same potential while the notice signal 32 to terminate the drive waveform is asserted, to control the panel into a non-scan state (scan is not performed while a voltage is applied). The segment driver 15 and the common driver 17 have a function for controlling their output terminals into a high impedance (electrically isolated) state. The FLC display panel 18 may be driven into a memory state by keeping the information electrode and the scan electrode at the same potential, or by driving them into the high impedance state which is a complete non-drive state (as distinguished from the non-scan state) which one of the methods is to be used to control the display panel into the memory state may be selected by the control from the display controller 12.

An operation of the FLC display panel 18 to return to the normal drive state from the memory state is now explained. When the access to the video memory 9 is performed at least once, the access sampling counter 7 immediately negates (disables) the notice signal 32 to inform to the display controller 12 of the access (write request) to the video memory 9. Since the notice signal 32 is negated asynchronously with the drive (scan) of the display panel 18, the display controller 12 negates the drive waveform output termination signals 33 and 36 to the segment and common drivers after the termination of the drive of the scan electrodes which are being scanned (in synchronism with the scan of the display panel) in order to restore the normal drive state, that is, the "(partial rewriting scan)+(entire screen refreshing scan)" state.

Figure 2:
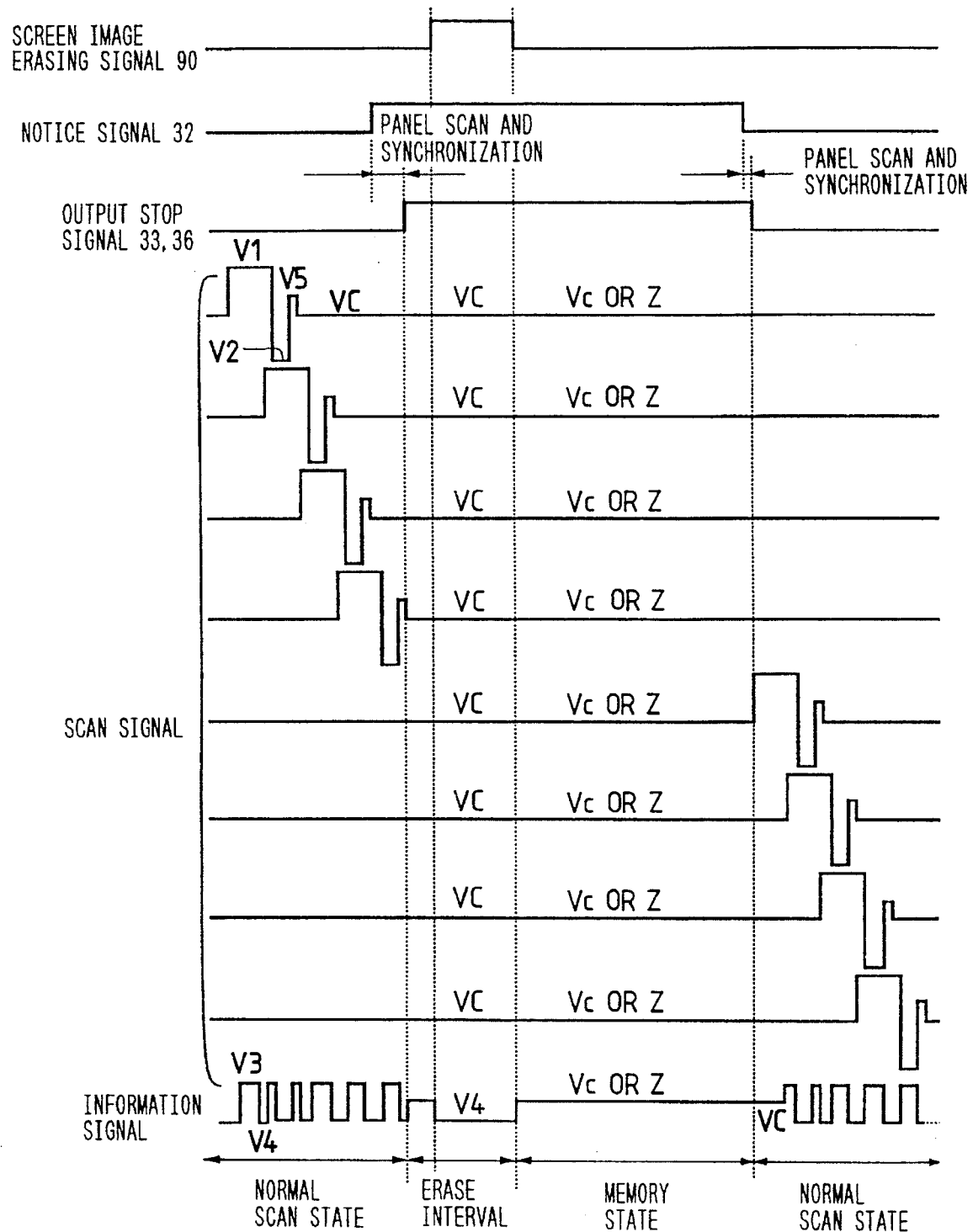
FIG. 2 is a timing chart for controlling the display panel of FIG. 1 in a memory state.

FIG. 2 illustrates the scan signal (drive waveform) applied to the scan electrodes and the information signal (drive waveform) applied to the information electrodes when the display panel 18 shifts to the memory state and then returns to the normal drive state. The scan electrode drive waveform produced by the common driver 17 erases all lines (one scan line) on an erase panel of a positive electrical field (voltage level: V1) and then writes by a write pulse of a negative electrical field (voltage level: V2). The write pulse is in synchronism with the information electrode drive waveform (voltage levels: V3, V4) produced by the segment driver 15. When a combined waveform exceeds a write threshold, it transits from the erase state to another state, and if the combined waveform does not exceed the threshold, the erase state is held. In this manner, two states are selectively used during the selection period (horizontal scan period) and is repeated for all scan lines to draw a desired pattern. After the normal scan drive output has been terminated, the segment drivers 15 for all bits produce signals of level V4 while the image erase signal 90 is at high level, and the scan driver 17 keeps the level Vc to erase the display state. Then, in order to switch to the memory state, the outputs of the common and segment drivers are kept at the same level (level Vc) or at the high impedance state (Z in FIG. 2) to keep the display panel in the erase memory state. In the erase memory state, the image is erased to white and stored, or erased to black and stored.

In the present invention, twisted nematic liquid crystal may be used in place of the ferroelectric liquid crystal.

The drive control means used in the present invention stops the application of the scan signal and the information signal by controlling the drive means such that the voltages applied to the scan electrodes and the information electrodes are of the same potential or the scan electrodes and the information electrodes are kept at the same high impedance state.

For a display device as described relative to FIGS. 1 and 2, the image is normally displayed in accordance with the image information which varies from time to time by the partial rewriting scan and the entire screen refreshing scan by the multi-interlaced scan. If the change detection means does not detect the change of the image information for the predetermined time period, the drive control means erases the display on the display panel and stops the application of the scan signal and the information signal. If the change detection means thereafter detects the change of the image information, the drive control means resumes the application of the scan signal and the information signal to resume the normal display. In this manner, the period of displaying the same image which causes the degradation of image quality is shortened, the degradation of image quality is prevented and the reliability of the device is improved.

Since the display device of the present invention comprises means for detecting the change of the image information and means for erasing the display, stopping the application of the drive signal and resuming the application of the drive signal in accordance with the detection result, the display screen is erased when there has been no change in the image information for a predetermined time period so that the power consumption is reduced and the reliability of the device is improved.

What is claimed is:

1. A display apparatus comprising:

a liquid crystal display panel having pixels arranged in a matrix of scan electrodes, each defining a scanning line, and information electrodes and having a ferroelectric liquid crystal driven by an electrical field applied through the scan electrodes and the information electrodes;

image information memory means for storing image information to be displayed on said liquid crystal display panel;

change detection means for detecting a change in the image information stored in said image information memory means;

drive means for applying a scan signal to said scan electrodes and an information signal to said information electrodes in accordance with the information stored in said image information memory means to effect a screen display; and drive control means for controlling said drive means so that said drive means, in response to the stored image information, executes display drive scanning in one of a partial rewriting scan and a full screen refreshing scan, wherein, when a change is detected in the information stored in said image information memory means, the partial rewriting scan is performed by non-interlace scanning for only the scanning lines corresponding to the changed information, and, when no change is detected in the information stored in said image information memory means, the full screen refreshing scan is performed by interlace scanning for the scanning lines of the full screen, said drive means applying a display erasing voltage between a group of the scan electrodes and a group of the information electrodes to erase the screen display when said change detection means detects that the stored image information has not changed over a predetermined time interval, and after applying the display erasing voltage, said drive means either applies a same voltage to the group of scan electrodes and the group of information electrodes or said drive means places the group of scan electrodes and the group of information electrodes into a high impedance state, with said drive means resuming the display drive scanning when said detection means detects that a change in the stored image information has taken place.

2. A display apparatus according to claim 1, wherein the screen display is erased into a white display state.

3. A display apparatus according to claim 1, wherein the screen display is erased into a black display state.

4. A display apparatus comprising:

a liquid crystal display panel having pixels arranged in rows and columns and defined by pairs of opposing electrodes with a liquid crystal disposed between the pairs of electrodes, with the pixels on the rows being connected in common by scanning lines and the pixels on the columns being connected in common by information lines;

image information memory means for storing image information to be displayed on said liquid crystal display panel;

change detection means for detecting a change in the image information stored in said image information memory means;

drive means for applying a scan signal to said scan lines and an information signal to said information lines in accordance with the information stored in said image information memory means to effect a screen display; and drive control means for controlling said drive means so that said drive means, in response to the stored image information, executes display drive scanning in one of a partial rewriting scan and a full screen refreshing scan, wherein, when a change is detected in the information stored in said image information memory means, the partial rewriting scan is performed by non-interlace scanning for only the scanning lines corresponding to the changed information, and, when no change is detected in the information stored in said image information memory means, the full screen refreshing scan is performed by interlace scanning for the scanning lines of the full screen, said drive means applying a display erasing voltage between a group of the scan electrodes and a group of the information electrodes to erase the screen display when said change detection means detects that the stored image information has not changed over a predetermined time interval, and after applying the display erasing voltage, said drive means either applies a same voltage to the group of scan electrodes and the group of information electrodes or said drive means places the group of scan electrodes and the group of information electrodes into a high impedance state, with said drive means resuming the display drive scan when said detection means detects that a change in the stored image information has taken place.

5. A display apparatus according to claim 4, wherein the screen display is erased into a white display state.

6. A display apparatus according to claim 4, wherein the screen display is erased into a black display state.

7. A display apparatus comprising:

a liquid crystal display panel having pixels arranged in a matrix of scan electrodes, each defining a scanning line, and information electrodes and having a liquid crystal having a memory function driven by an electrical field applied through the scan electrodes and the information electrodes;

image information memory means for storing image information to be displayed on said liquid crystal display panel;

change detection means for detecting a change in said image information memory means;

drive means for applying a scan signal to the scan electrodes and an information signal to the information electrodes in accordance with the information stored in said image information memory means to effect a screen display; and drive control means for controlling said drive means so that said drive means executes, in response to the stored image information, display drive scanning in one of a partial rewriting scan and a full screen refreshing scan, wherein, when a change is detected in the image information stored in said image information memory means, the partial rewriting scan is performed by a first scanning operation for the scanning lines corresponding to the changed information, and when no change is detected in the information stored in said image information memory means, the full screen refreshing scan is performed by a second scanning operation, and said drive means applies a display erasing voltage between a group of the scan electrodes and a group of the information electrodes to erase the screen display when said change detection means detects that the stored image information has not changed over a predetermined time interval, wherein the second scanning operation is performed for successive scanning in a manner of skip selection of the scan electrodes, and the first and second scanning operations are performed for selecting the scan electrode so that a display area scanned by the second scanning operation is greater than a display area scanned by the first scanning operation.

8. A display apparatus according to claim 7, wherein the first scanning operation is a non-interlace scanning, and the second scanning operation is an interlace scanning.

9. A display apparatus according to claim 7, wherein said liquid crystal is a ferroelectric liquid crystal.

* * * * *

UNITED STATES PATENT AND TRADEMARK OFFICE
CERTIFICATE OF CORRECTION

PATENT NO. : 5,606,343
DATED : February 25, 1997
INVENTOR(S) : AKIRA TSUBOYAMA, ET AL.

It is certified that error appears in the above-indentified patent and that said Letters Patent is hereby corrected as shown below:

AT [57] ABSTRACT:

Line 10, "detection" should read --the detection--.

COLUMN 1

Line 18, "flicker and a" should read --flicker. A--;
    Line 27, "the" should be deleted; and
    Line 56, "Kambe et al" should read --Kanbe et al.--.

COLUMN 2

Line 56, "VGA" should read --(VGA)--.

COLUMN 3

Line 22, "unit 50" should read --unit 50,--;
    Line 25, "transfer," should read --transfers--;
    Line 33, "a" (second occurrence) should be deleted; and
    Line 65, "send" should read --sends--.

Signed and Sealed this

Twenty-eighth Day of October, 1997

Attest:

BRUCE LEHMAN

*Attesting Officer*      *Commissioner of Patents and Trademarks*